April 8, 1969     E. J. DEY     3,437,119
CAPTIVE BOLT UNIT
Filed July 26, 1967
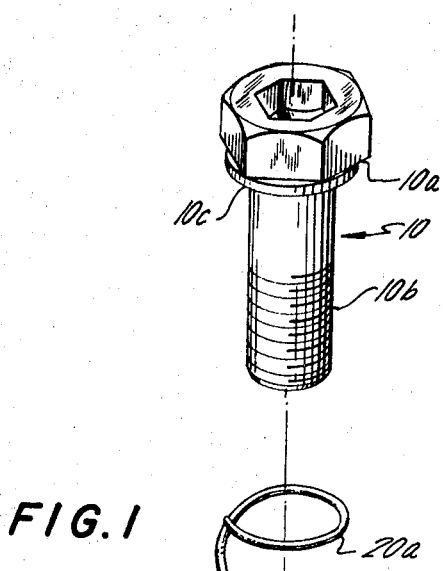
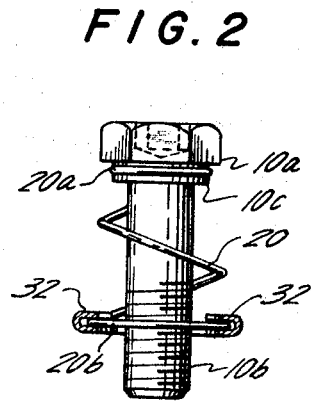
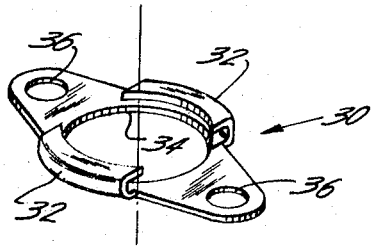
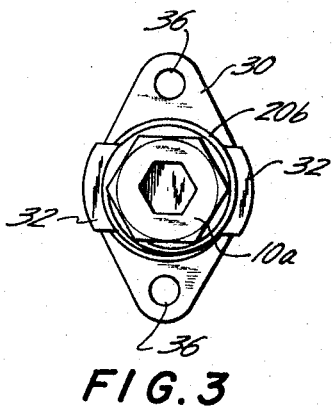
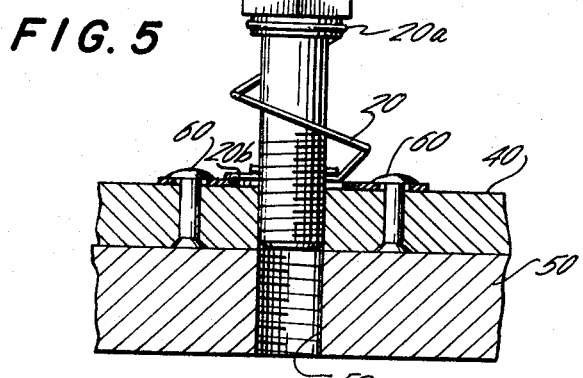
INVENTOR.
ERVIN J. DEY
BY Andrew L. Ney
ATTORNEY United States Patent Office 3,437,119
Patented Apr. 8, 1969

3,437,119
CAPTIVE BOLT UNIT
Ervin J. Dey, Santa Fe Springs, Calif., assignor to Standard Pressed Steel Co., Jenkintown, Pa., a corporation of Pennsylvania
Filed July 26, 1967, Ser. No. 656,268
Int. Cl. F16b 43/00
U.S. Cl. 151—69                                7 Claims

ABSTRACT OF THE DISCLOSURE

A captive bolt unit in which a bolt is attached to a retainer plate by means of a coil spring which surrounds the shank of the bolt. The retainer plate is adapted for attachment of the unit to a panel and has a central opening through which the shank of the bolt projects. The coil spring and the opening in the retainer plate are arranged to permit the underside of the head of the bolt to pass through as the spring is compressed and the bolt is applied through the panel to a structural member. As a result, the bolt head bears directly against the panel when the bolt is applied to the structural member.

---

The present invention relates, in general, to fastening devices and, in particular, to a captive bolt unit by means of which a bolt may be retained in a panel.

Removable panels normally are attached to housings and other structural members by bolts. A loose bolt is susceptible to being lost as the panel is being attached to another member or after the panel has been removed from this member. In addition, a loose bolt makes it difficult for a workman to mount a panel. The workman is concerned concurrently with supporting the panel, aligning holes and inserting bolts into these holes.

Various captive bolt units have been developed in the past to overcome the problems created through the use of loose bolts. Generally, these captive bolt units suffer from one or more shortcomings which render them impractical for many applications. Some have an excessive number of component parts rendering them susceptible to frequent failures or too expensive to be commercially competitive. Others are so arranged as to prevent their use in high strength applications.

Accordingly, it is an object of the present invention to provide a new and improved captive bolt unit.

It is another object of the present invention to provide a captive bolt unit which may be used in high strength joints.

It is a further object of the present invention to provide a captive bolt unit which is relatively simple in construction, inexpensive to fabricate and reliable in operation.

A captive bolt unit constructed in accordance with the present invention includes a bolt having a head with an underside bearing surface and a coil spring having an inside diameter greater than the maximum dimension of the underside bearing surface. One end of the coil spring is retained on the periphery of the head of the bolt. Also included in this captive bolt unit is a retainer plate on which a second end of the coil spring is retained. The retainer plate has a hole through which the shank of the bolt may project. This hole is large enough to permit the underside bearing surface of the head of the bolt to pass through, whereby as the captive bolt unit is applied to a member, the underside bearing surface bears against this member.

For a better understanding of the present invention, together with other and further objects thereof, reference is made to the following description, taken in connection with the accompanying drawing, and its scope will be pointed out in the appended claims.

Referring to the drawing:

FIGURE 1 is an exploded perspective view of a captive bolt unit constructed in accordance with the present invention;

FIGURE 2 is a side view of the captive bolt unit of FIGURE 1 after it has been assembled;

FIGURE 3 is a top plan view of the unit shown in FIGURE 2;

FIGURE 4 is a side view of a portion of a bolt used in the unit of FIGURE 1; and FIGURE 5 is a vertical section showing a captive bolt unit constructed in accordance with the present invention holding two members together.

Referring to FIGURES 1, 2, 3, and 4, a captive bolt unit constructed in accordance with the present invention includes a bolt 10 having a head 10a and a threaded shank 10b. Bolt head 10a has a circular region 10c of reduced diameter. Extending around the periphery of region 10c is a groove 10d.

Also included in the captive bolt unit of the present invention is a coil spring 20 which is mounted on bolt 10 by means of one end 20a of the coil spring being slideably retained in groove 10d in the bolt head. The coil spring is so arranged as to have an increasing diameter along its length. As a result, end 20b of the coil spring has a greater diameter than end 20a.

The captive bolt unit of the present invention further includes a retainer plate 30 which is provided with a pair of peripheral flanges 32 within which end 20b of the coil spring is retained. Peripheral flanges 32 extend inward toward the center of retainer plate 30 from its periphery. Retainer plate 30 is disposed generally perpendicular to the longitudinal axis of bolt 10. The retainer plate has an annular configuration with a central hole 34 through which shank 10b of the bolt projects. In addition, retainer plate 30 is provided with a pair of holes 36 through which screws may be passed so that the retainer plate may be secured to a panel.

Coil spring 20 and hole 34 in retainer plate 30 are so dimensioned that the inside diameter of the coil spring and the diameter of hole 34 are greater than the maximum dimension of the underside of bolt head 10a. As a result, when the captive bolt unit of the present invention is applied to a panel and the threaded shank is inserted into a threaded well or female fastener, the underside of the bolt head may bear directly against the panel to which the captive bolt unit is applied. This is most clearly illustrated in FIGURE 5 which shows the captive bolt unit secured to a panel 40 which, in turn, is attached to a structural member 50. Specifically, a pair of screws 60, extending through the holes 36 in retainer plate 30, fasten the retainer plate to panel 50. Coil spring 20 keeps bolt 10 in a retracted position so that the threaded shank of the bolt will not protrude from the panel mating surface and interfere with assembly operations. The threaded shank of bolt 10 is inserted into a tapped hole 52 in member 50 by first pushing the bolt axially to compress coil spring 20 and then turning the bolt into the tapped hole. The bolt head is provided with a hexagonal wrenching surface and a hexagonal recess adapting it for engagement by two different tools for seating of the bolt. Because the inside diameter of coil spring 20 and the diameter of hole 34 in retainer plate 30 are greater than the diameter of the region 10c of the bolt head, the underside of the bolt head may bear directly against the outside surface of panel 40. This provision of the captive bolt unit of the present invention permits its application in high strength joints since no intermediate components are employed between the bolt head and the panel.

Although the present invention has been described and illustrated as employing a bolt as the fastener element, with suitable modifications a nut may be employed with equal facility.

While there has been described what is at present considered to be the preferred embodiment of this invention, it will be obvious to those skilled in the art that various changes and modifications may be made therein without departing from the invention.

What is claimed is:

1. A fastener unit comprising:
   a fastener having an underside bearing surface;
   a coil spring on said fastener having an inside diameter greater than the maximum dimension of said underside bearing surface, one end of said coil spring retained on the periphery of said fastener; and
   a retainer plate on which a second end of said coil spring is retained and having a first hole through which said fastener may project, said retainer plate also having second and third holes adapted to receive mounting fasteners passed through said second and third holes to secure said retainer plate to a member, said first hole in said retainer plate being large enough to permit said underside bearing surface to pass through, whereby as the surface of said retainer plate opposite from the surface on which said coil spring is retained is applied to said member, said underside bearing surface may bear against said member.

2. A captive bolt unit according to claim 1 wherein said underside bearing surface is circular.

3. A captive bolt unit comprising:
   a bolt;
   a coil cpring on said bolt and having a first end retained on the periphery of the head of said bolt; and
   a retainer plate to which a second end of said coil spring is secured and having a first hole through which the shank of said bolt may project, said retainer plate also having second and third holes adapted to receive mounting fasteners passed through said second and third holes to secure said retainer plate to a member, said first hole in said retainer plate being large enough to permit the underside of said head of said bolt to pass through, whereby as the surface of said retainer plate opposite from the surface on which said coil spring is retained is applied to said member, said underside of said head may bear against said member.

4. A captive bolt unit according to claim 3 wherein said head has a peripheral groove and said first end of said coil spring is slideably retained in said peripheral groove.

5. A captive bolt unit comprising:
   a bolt having a head and a threaded shank, said head having a peripheral groove;
   a coil spring on said bolt and having a first end slideably retained in said peripheral groove and a second end of greater diameter than said first end surrounding said threaded shank; and
   a retainer plate of annular configuration on which said second end of said coil spring is retained and through which said threaded shank propects, said retainer plate having an inside diameter large enough to permit the underside of said head to pass through, said retainer plate also having first and second mounting holes adapted to receive mounting fasteners passed through said first and second mounting holes to secure said retainer plate to a member, whereby as said retainer plate is secured to said member and said bolt is applied to said member, said underside of said head bears against said member.

6. A captive bolt unit according to claim 5 wherein said retainer plate is disposed generally perpendicular to the longitudinal axis of said bolt.

7. A captive bolt unit according to claim 6 wherein said retainer plate has at least one peripheral flange within which said second end of said coil spring is retained.

References Cited

UNITED STATES PATENTS

| | | | |
|---|---|---|---|
| 1,664,820 | 4/1928 | Hughes | 151—69 |
| 2,151,255 | 3/1939 | Witchger | 151—69 |
| 2,967,557 | 1/1961 | Tait et al. | 151—69 |
| 3,263,728 | 8/1966 | Lynch | 151—69 |
| 3,295,578 | 1/1967 | Maloof | 151—69 |

FOREIGN PATENTS 626,013  7/1949  Great Britain.

MARION PARSONS, Jr., *Primary Examiner.*